March 31, 1959 A. M. STONER 2,880,007
KEY OPERATED INTERNALLY GEARED CHUCK
Filed Dec. 27, 1957 4 Sheets-Sheet 1
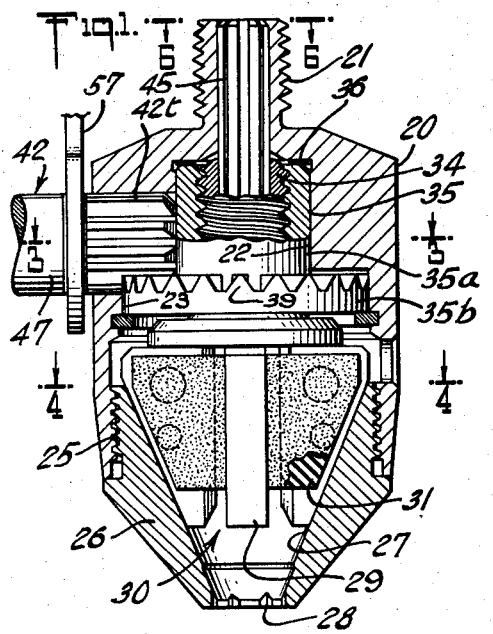
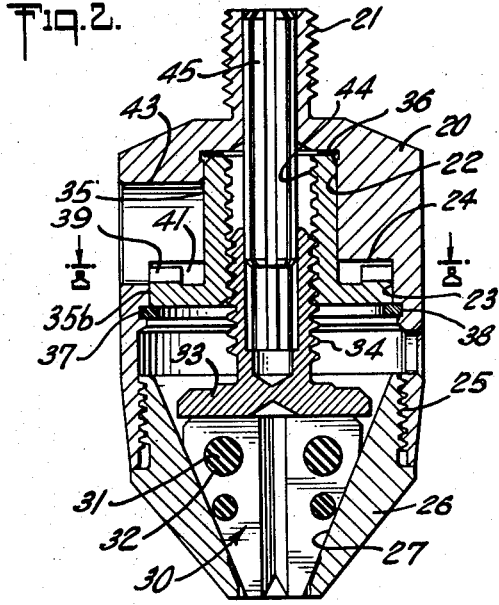
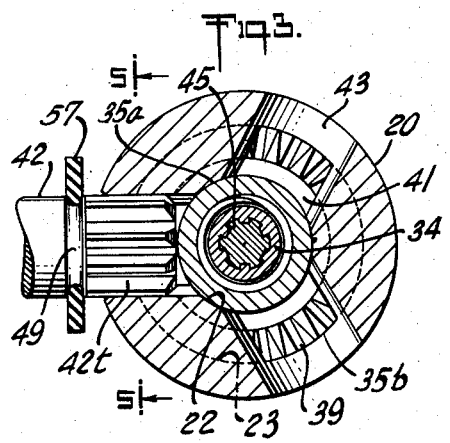
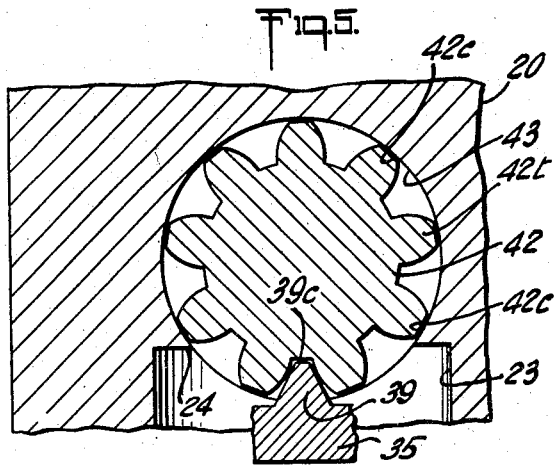
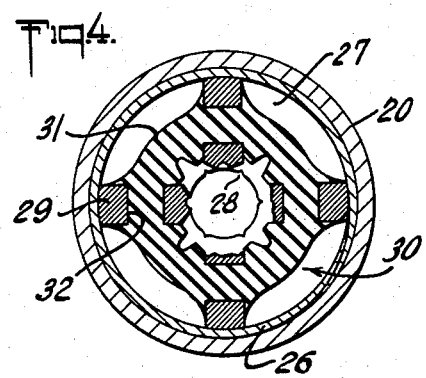
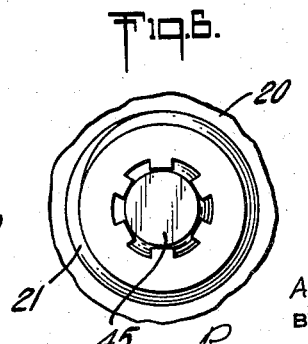
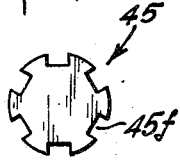
INVENTOR
ARTHUR MERRICK STONER
BY
Raymond G. Mullee
ATTORNEY

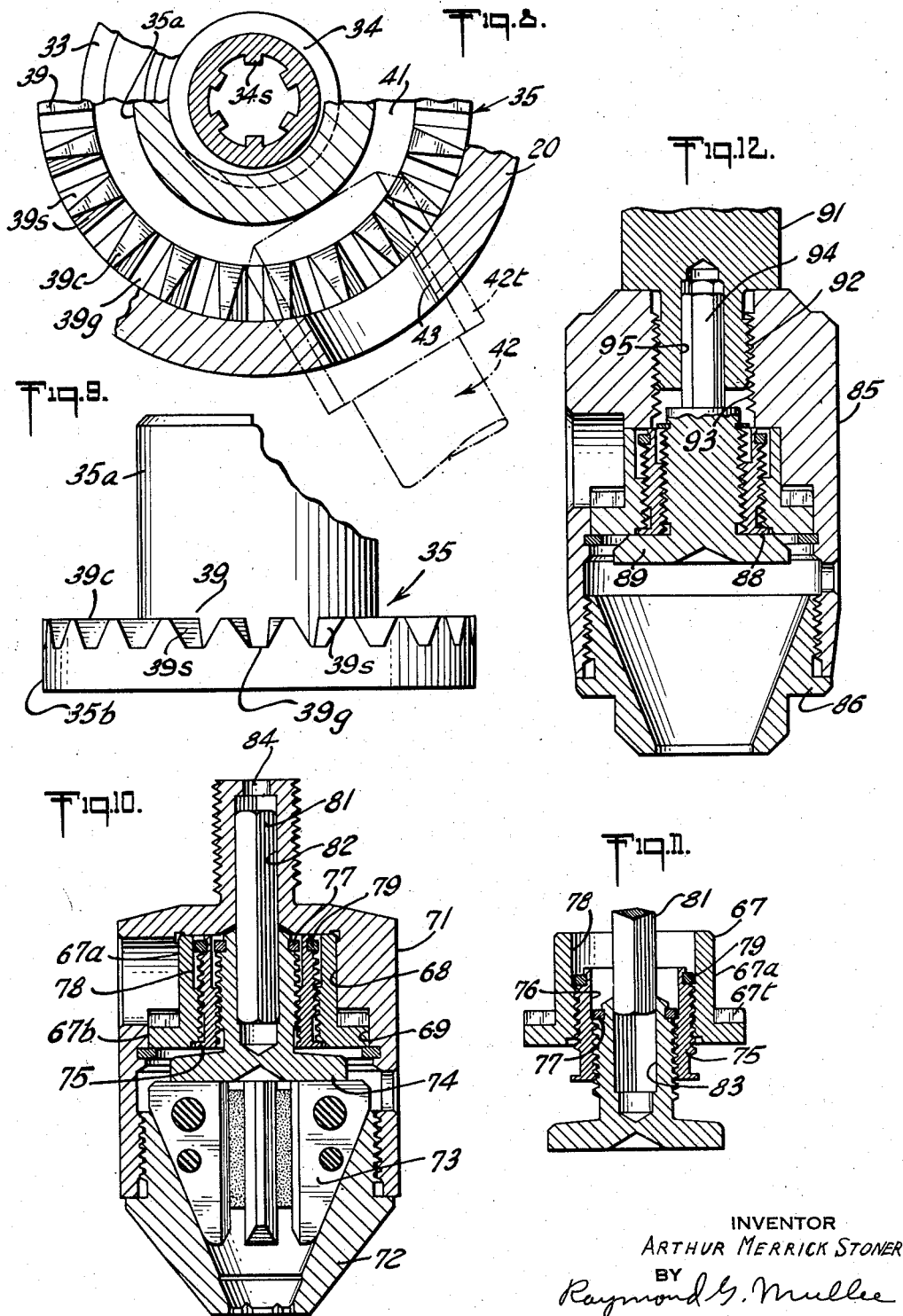

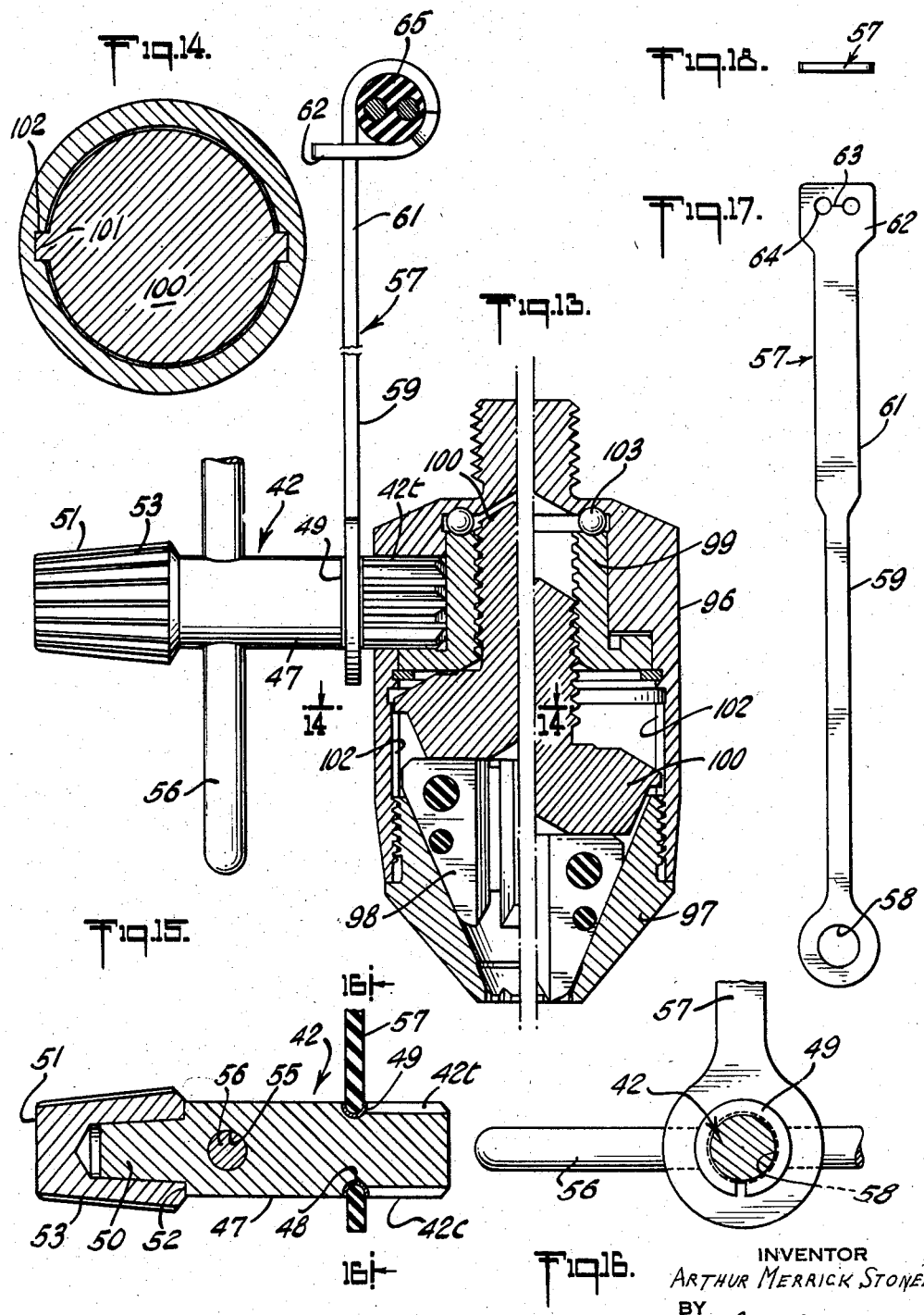

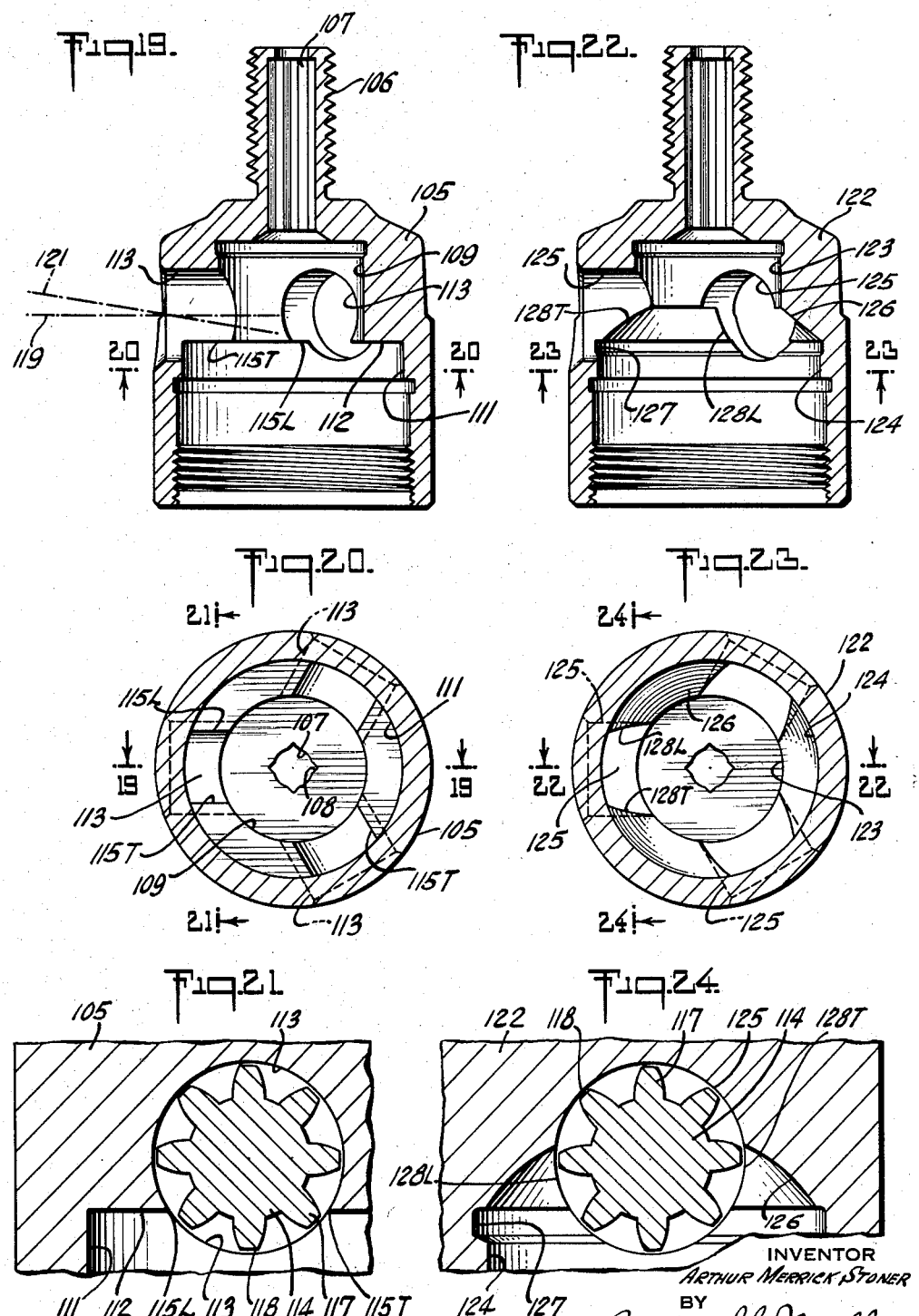

United States Patent Office 2,880,007
Patented Mar. 31, 1959

2,880,007

KEY OPERATED INTERNALLY GEARED CHUCK

Arthur Merrick Stoner, Madison, Conn., assignor to The Jacobs Manufacturing Company, West Hartford, Conn., a corporation of New Jersey Application December 27, 1957, Serial No. 705,534

26 Claims. (Cl. 279—53)

This invention relates to chucks, particularly of the class in which the jaws are tightened by manipulation of a key which is turned about an axis transverse to the chuck body. In such a chuck, the key operates through a transmission device, either to effect relative axial movement of the jaws against a tapered recess, or to move the jaws along inclined bores, thus forcing the jaws together with a camming action.

This application is a continuation in part of parent application Serial No. 638,249, filed February 5, 1957.

In one type of chuck of this class, which is in common use, the tapered recess is provided upon a cam sleeve or nose piece threaded onto the end of the chuck body, and the transmission device between the rotatable key and the chuck jaws comprises an eccentric shaft extending diametrically of the chuck, one end of the shaft having an hexagonal opening for the reception of the key. This type of chuck, known as the hex-key operated chuck, has a disadvantage residing in the space taken up by the diametrical shaft. It has a serious limitation in that the amount of axial motion imparted to the chuck jaws by the key alone is limited to the extent of eccentricity of the shaft. In order to increase the capacity of a chuck of the hex-key type, it is the practice to arrange the cam sleeve or nose piece in adjustable screw threaded relation to the chuck body. In such an arrangement the operator first turns the nose piece to bring the jaws into initial contact with the work, and then turns the hex-key to effect the final tightening operation. This type of chuck produces satisfactory results in the hands of a skilled operator. But sometimes an unskilled worker, through lack of instruction or through inadvertence, fails to determine correctly when to use one adjustment and when the other, with the result that the chuck jaws are not adequately tightened and frequently slip causing premature wear.

In another type of key operated chuck which is in common use, the transmission between the key and the jaws comprises a system of gearing including a bevel pinion forming a part of the manipulative key. In this type, the axial travel of the jaws in response to key operation is not limited by the transmission device and, therefore, it is not necessary to provide a supplementary means of adjustment. Gear operated chucks now in use, however, generally possess one or more of the following drawbacks:

(1) A portion of the gearing lies on the exterior of the chuck where it may endanger the operator during rotation of the chuck.

(2) The torque reaction transmitted back through the key when the jaws are finally tightened has a component of force, due to the frusto-conical shape of the bevel gear, which tends to disalign the axis of rotation of the key and, therefore, to bend the pilot portion of the key at its inner end where it is supported in a bearing in the chuck body.

(3) The operator sometimes neglects to insert the key for its full depth, thereby causing partial meshing of the gear teeth with the result that the crests of the teeth become damaged or worn out prematurely.

The general object of this invention is to overcome the disadvantages of conventional types of key operated chucks, without sacrificing the advantages thereof.

A specific object is to provide a key operated chuck which operates with a single action, or method of adjustment, and automatically locks the jaws securely in clamping position as soon as the operator stops turning the key.

Another object is the provision of a chuck in which all of the gearing operated by the key is located within the chuck body, thus avoiding the hazards incident to exposed gearing.

A further object is the provision of a pinion forming part of the key and so supported that the reactive forces are all in a torsional direction with no components or moments of force tending to disalign the axis of the key or to cause bending of the body portion thereof. Accordingly, a feature of this invention resides in a pinion having teeth whose crests are arranged to form an interrupted cylindrical surface, supported in a correspondingly shaped radial bore in the chuck body.

A still further object is to permit complete meshing of the pinion with the adjacent driven gear even when the key is not fully inserted in the chuck body. Accordingly, a feature of the invention resides in a face gear member driven by the pinion and having teeth of uniform altitude meshing with similar teeth on the pinion.

Another feature of the invention resides in the shape and arrangement of the various bores and surfaces provided in the chuck body. The body has an axially extending bore and counterbore for rotatably supporting the face gear member, the end wall or shoulder of the counterbore being interrupted where it is cut through by the radial bore aforesaid which rotatably supports the pinion. The radial bore and end wall may form a sharp edge where they meet and it is an object of the invention to prevent the teeth of the pinion from clashing with a sharp edge. In one form of the invention this object is attained by chamfering the shoulder or end wall of the counterbore, or in other words, by forming the shoulder as a frustum of a cone.

Still another object of the invention is to minimize the force required to turn the key, without permitting the jaws to slip when the key is removed. To this end, a feature of the invention resides in a threaded connection of the jack screw type between the face gear and the thrust plate.

Another object is to shorten the dimensions of the chuck without reducing its capacity or length of radial movement of the jaws. In some forms of this invention, the thrust plug, which abuts against the jaws, is prevented from rotating by a novel spline arrangement located internally of the thrust plug. The splines extend longitudinally and project inwardly from the wall of a central recess in the thrust plug which is in a recess surrounded by the threaded portion thereof. In this location the splines do not take up room or add to the axial length of the chuck body, as would be the case if the splines were formed on the exterior of the thrust plug. In some forms of invention, there is a further saving of space by the use of a three-element telescopic screw comprising the internally threaded face gear member, an intermediate bushing threaded on both inside and outside, and the externally threaded thrust plug.

A further object is to reduce the manufacturing cost of a chuck of the class described.

Other objects and features of the invention will appear more clearly from the following description taken in connection with the accompanying drawings and appended claims.

2,880,007

In the accompanying drawings:

Fig. 1 is a view, chiefly in longitudinal section, of a chuck embodying this invention, the jaws of the chuck being spread apart, showing also a fragmentary portion of the rotating key and its support;

Fig. 2 is a longitudinal section of the chuck shown in Fig. 1 but with the jaws contracted;

Fig. 3 is a cross-section as indicated by the arrows 3 in Fig. 1;

Fig. 4 is a cross-section through the chuck jaws as indicated by the arrows 4 in Fig. 1;

Fig. 5 is an enlarged sectional view through the rotating key and a fragmentary part of the housing and face gear as indicated by the arrows 5 in Fig. 3;

Fig. 6 is an enlarged plan view, as indicated by the arrows 6 in Fig. 1, showing the connection between the stationary key and the upper extension of the chuck body;

Fig. 7 is a plan view of the fluted stationary key, enlarged to the same scale as Fig. 6;

Fig. 8 is an enlarged cross-section as indicated by the arrows 8 in Fig. 2, with parts broken away, showing in dot-dash lines one of the relative positions of the driving pinion;

Fig. 9 is a side elevation of the face gear member enlarged to the same scale as Fig. 8;

Fig. 10 is a longitudinal section of a modified chuck embodying this invention, with the jaws and associated thrust plug shown in raised or spread position;

Fig. 11 is a fragmentary longitudinal section of the modified chuck of Fig. 10, showing the thrust plug adjusted to its lowermost position for collapsing the jaws;

Fig. 12 is a longitudinal section of another modified chuck embodying this invention;

Fig. 13 is a longitudinal section of still another modified chuck in association with the rotatable key and its supporting means, the left side of the figure showing the jaws raised and the right side showing the jaws lowered or collapsed;

Fig. 14 is a cross-section as indicated by the arrows 14 in Fig. 13, showing the splined connection between the thrust plug and the chuck body;

Fig. 15 is a longitudinal section through the rotatable key of Fig. 13;

Fig. 16 is a cross-section taken through the rotatable key as indicated by the arrows 16 in Fig. 15;

Fig. 17 is a side view in elevation of the key holder for the rotatable key, on a smaller scale than Figs. 13, 15 and 16;

Fig. 18 is a plan view of the rotatable key holder on the same scale as Fig. 17;

Fig. 19 is a longitudinal section of a further modification of chuck body;

Fig. 20 is a cross-section through the modified chuck body as indicated by the arrows 20 in Fig. 19;

Fig. 21 is an enlarged fragmentary section of the modified chuck body as indicated by the arrows 21 in Fig. 20, and showing also the associated pinion;

Fig. 22 is a longitudinal section of another modification of chuck body having a chamfered shoulder;

Fig. 23 is a cross-section through the chuck body just below the chamfered shoulder, looking up as indicated by the arrows 23 in Fig. 22; and Fig. 24 is an enlarged fragmentary section through the chamfered shoulder of the chuck body as indicated by the arrows 24 in Fig. 23, and showing also the associated pinion.

In the embodiment of invention shown in Figs. 1-9, the chuck comprises a body 20 having at its upper end a threaded extension 21 to provide means of attachment to a machine tool or portable drill (not shown). For convenience of description, it will be assumed that the body 20 is mounted on a vertical axis and is stationary during the gripping and releasing movements of the parts of the chuck.

Referring particularly to Fig. 2, the body 20 is provided with a central bore 22 and a counterbore 23 separated therefrom by a horizontal wall or shoulder 24. At its lower end the body is rigidly secured, by a threaded connection 25, to a nose piece 26. The nose piece and body together form a unitary housing which substantially encloses all of the moving parts of the chuck. The nose piece has a central conical recess 27 tapering downwardly and terminating in a small opening at the bottom of the nose piece, the opening being provided with notches 28 adapted for the reception of a hexagonal wrench (not shown). By this means, the nose piece 26 may be removed from and replaced on the body 20 for servicing but is not designed to be moved or adjusted at any time during the operation of the chuck. The tapered recess 27 is adapted to engage the outer edges of a plurality of jaws 29 which edges have a corresponding slope. While the jaws may be of any suitable type or number, they are preferably arranged to form a rubber collet assembly 30 in which the jaws 29 consist of several metal plates spaced equi-distantly in radial planes and connected by a body of synthetic resilient rubber 31. As shown best in Fig. 4, the rubber body extends between the side face of the jaws and through holes 32 in the jaw plates. The rubber tends to separate the jaws toward the position shown in Fig. 1 in which they are adapted to freely receive a work piece (not shown), but permits the jaws to collapse to grip the work piece along the inner edges of the metal plates when the collet is forced downward against the conical recess 27 shown in Fig. 2.

Such clamping movement of the jaws in opposition to the rubber body 31 is effected by a thrust plug 33. The lower end of the thrust plug forms an abutment disc engaging the upper ends of the metal jaw plates 29. The thrust plug is reciprocated by means of a novel transmission device or gearing arrangement which will now be described. The thrust plug has an upward extension 34 which is threaded for engagement within a face gear member 35. The latter is provided at its periphery with two cylindrical portions 35a and 35b fitting the bore 22 and counterbore 23 respectively, thereby supporting the face gear member for rotation in the body 20. The upper extremity of the face gear portion 35a seats against a thin bronze washer 36 located at the closed end of the bore 22 to sustain upward thrusts of the rotating face gear member 35 against the chuck body 20. Downward movement of the face gear member is limited by a snap ring 37 engaging the bottom of the face gear member 35 and seated in an annular recess 38 in the body 20, said recess lying immediately adjacent the counterbore 23.

The flange or enlarged portion of the face gear member 35, which lies within counterbore 23, is generally in the shape of a disc having on its upper surface an annular series of gear teeth 39 surrounding an annular groove 41. As shown best in Fig. 8, the teeth are so shaped and arranged as to provide a face gear meshing with a cylindrical pinion 42. Referring to Figs. 1, 3 and 5, the pinion is provided with any suitable number of (for example, 9) longitudinally extending teeth 42t. The teeth on pinion 42 are similar in profile to the usual involute teeth on a standard pinion gear, but the standard gear design is compromised to obtain a maximum of gear tooth area on the addendum circle. For this purpose, the crests of the teeth are formed as cylindrical surfaces 42c providing a bearing engagement within any selected one of three radial bores 43 in the body 20, as shown best in Fig. 5. The axes of the bores 43 lie in a plane which is spaced above the horizontal wall 24 by a distance somewhat less than the radius of the bores, so that the lowermost teeth 42t on the pinion project into the space surrounded by the counterbore 23, as shown in Figs. 1, 2 and 3.

The face gear teeth 39 have crests 39c (Figs. 5, 8 and 9) which lie in a common horizontal plane parallel to and out of contact with the horizontal wall 24 on the body 20. The grooves 39g separating the teeth 39 extend in a radial direction and terminate at their lower portions in a flat surface having parallel sides and lying in a plane which is horizontal or perpendicular to the axis of rotation. The sides 39s of the teeth 39, adjacent the groove 39g are substantially flat with a variable inclination which is less at the inner end than at the outer end, as shown in Figs. 8 and 9. Teeth 39 mesh with the pinion 42 as shown in Figs. 1, 3, 5 and 8. Ordinarily, the pinion is inserted in one of the radial bores 43 until limited by contact of its inner extremity with its cylindrical extension 35a of the face gear as shown in broken lines in Fig. 8. If, through inadvertence, however, the pinion is not inserted for the full depth of the bore 43, or if the pinion is displaced along its axis away from the Fig. 8 position, conjugal action between the pinion and face gear will not be affected and no harm will result. This advantage results from the uniform cross-section of the toothed portion of the pinion, as seen by comparing Figs. 3 and 5, and from the shape and arrangement of the face gear member 35 whose teeth 39 have a uniform altitude from their inner to their outer ends. This is an important feature of the invention because in the usual plain bearing key type chucks employing conventional bevel gears, if the key is not fully inserted the gear teeth mesh on their tip ends only, resulting in severe distortion and excessive wear of teeth. Due to the configuration of the face gear member 35 with the cylindrical extension 35a, it has not been found practicable to cut the teeth 39 by means of conventional gear cutting equipment. However, the teeth may be machined with a Fellows gear shaper. In such a machine, a cutter, shaped like the pinion teeth 42t, reciprocates and rotates on its axis and the gear blank is turned according to the desired ratio between the pinion and face gear. The annular groove 41 inside the gear teeth provides the necessary clearance for the chips and end of the inward stroke of the cutter. Alternatively, the face gear member 35 may be formed by casting or by pressing blanks with suitable dies in a coining press.

Referring particularly to Fig. 2, the inner part of the face gear member 35 has a screw thread 44 adapted to receive the threaded extension 34 on the thrust plug 33. The inter-engaging threads are preferably left hand as shown in Fig. 1. The threaded connection, which is comparable to a jack screw, is self-locking or non-reversible. That is to say, the inclination of the threads is less than the angle of friction whereby relative axial force applied to the complementary threaded parts 33 and 35 will not overcome friction to cause them to rotate, although of course, relative rotary force applied therebetween will result in relative axial movement.

In order to hold the thrust plug 33 from rotating while the face gear is turned by means of the pinion 42, the present invention provides a stationary key 45 (Fig. 2) extending coaxially of the chuck. In this embodiment of invention, the stationary key has a cylindrical periphery interrupted by six longitudinal grooves or flutes 45f extending from the upper to the lower end of the key. As seen in Fig. 7, each groove extends radially and has parallel sides. At its upper end, the fluted key 45 has a tight fit within a complementary shaped opening in the upper extension 21 of the body 20 (Fig. 6) and while the key may be forcibly detached from the body for purposes of servicing, it does not move relative to the body during the operation of the chuck. The lower portion of the stationary key has a sliding but non-rotating fit with a complementary shaped bore formed in the extension 34 on the thrust plug 33, as shown in Figs. 2 and 3. The plug is provided with longitudinal tongues or splines 34s (Fig. 8) extending radially inward. Each spline has parallel sides fitting the sides of the flutes 45f (Fig. 7) to prevent any appreciable rotary movement of the thrust plug, but to permit the thrust plug to slide along the key 45 with minimum friction. The splined hole in the thrust plug extension 34 may be produced by broaching.

If desired, the radial length of the splines 34s may be made somewhat shorter than the depth of the flutes 45f. This will provide greater tolerance with respect to any eccentricity of the stationary key 45 or thrust plug 33 without allowing any play or lost motion in a rotary direction. This is one advantage of the fluted key 45 of this form of invention as compared for example with a key having the cross-section of a regular polygon. Another advantage is that the torque reaction or rotative thrust between plug 33 and stationary key 45 is sustained over surfaces which are nearly radial and which are located only adjacent the part of the key of maximum diameter, where the moment arm is greatest. As a result, this fluted arrangement minimizes (for any given torque reaction) the corresponding pressure on the sliding areas and thus minimizes the longitudinal sliding friction between the thrust plug 33 and the stationary key 45. This is an advantage because the operator, in turning pinion 42, must overcome, not only the longitudinal sliding friction aforesaid, but also the friction between the threads 34, 44; and any increase in the former would cause a corresponding rise in the latter.

The pinion 42 forms part of a rotatable key assembly constructed and supported in a novel manner for convenient manipulation. As shown in Fig. 15, the pinion has a cylindrical body 47 coaxial with the toothed portion 42t and separated therefrom by an annular groove 48 having the shape of a half torus. The groove is adapted for the reception of a brass grommet 49 to be described later. At its opposite end, the pinion 42 has a tapered extension 50 which has a press fit within a correspondingly shaped opening in a knob 51. Adjacent the tapered extension 50, the pinion has a shoulder 52 in abutting engagement with the knob 51. The knob has a tapered periphery provided with flutes 53 enabling it to be grasped conveniently between the thumb and forefinger of the operator for rapidly turning the rotatable key assembly, including the pinion 42, when there is little resistance to rotation. The pinion body 47 has a diametrical hole 55 which receives, with a tight fit, a wire handle or cross bar 56. The cross bar is adapted to be grasped between the operator's fingers to enable him to turn the key assembly when the resistance to rotation is more substantial. The knob 51 may be of metal formed by die casting, or may be composed of plastic material. Since it transmits only a relatively small torque to the pinion, there is no difficulty in providing a sufficiently secure connection between the knob and the pinion 42. The wire handle prevents excessive torque from being applied to the gear teeth 42t and 39 because it is designed to bend at torques considerably less than the breaking point of the teeth. The pinion 42 consists of an integral structure comprising toothed portion 42t, body 47 and extension 50. This part, like the other parts of the rotatable key assembly, is inexpensive and easy to make. In the manufacture of the pinion 42, the plain cylindrical diameter 47 facilitates chucking and the pinion can be passed through the gear cutter work holding spindle for automatic loading.

In order to support the rotatable key assembly 42, 51, 56 in convenient position for use, and to prevent the displacement or loss of the key, the grommet 49 is arranged to be supported by a flexible strap 57. The strap, which is shown unassembled in Figs. 17 and 18, is cut from a flat strip, preferably made from oil-resisting synthetic rubber. At its lower end, the strip 57 has an opening 58 whose normal unstressed diameter is slightly less than that of the toothed portion 42c of the pinion 42. The brass grommet 49, as seen in Figs. 15 and 16, has an annular groove or toroidal recess at its outer periphery which snugly receives the apertured portion 58 of the strap. The grommet is convex on its inside to provide a swivel support on the pinion 42 adjacent the toothed portion 42t. As seen in Fig. 16, the grommet is in the form of a split ring. It is adapted to be expanded, slipped over the toothed portion 42t, while in open condition, and then assembled within the annular groove 48 by means of a squeezing or crimping action. To assemble the strap with relation to the grommet, the area surrounding the hole 58 is stretched to the maximum diameter of the tooth edges 42c and grommet 49 to permit it to be passed thereover. Extending upward from the apertured portion 58, the strap 57 has a narrow portion 59 above which lies a body portion 61. The latter terminates in a head 62 having a transverse slit 63 extending between two holes 64. The perforated portion 63, 64 may be stretched to provide a slot or opening of substantial size. In use, the body portion 61 is wrapped around a suitable support such as the wire 65 (Fig. 13) which delivers power to the portable electric drill (not shown); the apertured lower end of the strap, surrounding the hole 58 is folded and inserted through the stretched or opened slit 63, and the lower end 58 of the strap is pulled until the narrow portion 59 and later a part of the body portion 61 have passed through the slit 63 and the upper end of the strap 57 snugly embraces the wire 65 as shown in Fig. 13. The lower end 58 is then forced into position on the grommet 49 as described above, whereupon the rotatable key assembly comprising manipulative knob 51 and pinion 42 is supported for movement into and out of working position at the will of the operator. If desired, the strap 57 may be shifted along the length of the wire to any desired position and then frictionally locked to its position of support on the wire. With this end in view, the holes 64 are so dimensioned and spaced that the length of slit 63 added to the combined diameter of two holes 64 is equal to the width of the body portion 61. To release the strap for shifting along the wire, and to lock it in adjusted position, the body 61 is respectively pushed into, and pulled out of, the slotted head 62.

Summarizing the operation of the first form of invention, assume that the chuck jaws 29 are in expanded condition as shown in Fig. 1, that the operator has inserted a work piece such as a drill bit (not shown) loosely between the jaws, and that he desired to clamp the work piece by moving the jaws downward and inward toward the position of Fig. 2. The nose piece 26, being firmly seated against the lower end of the body 20, cannot move upward therein and, therefore, the only way the operator can collapse the jaws is to bring the thrust plug 33 downward. To this end, the operator first grasps the rotatable key by the knob 51 thereof and inserts the pinion 42 of said key through one of the radial bores 43 (Fig. 3). The pinion is supported for rotation about its individual axis by engagement of the cylindrical periphery 42c of its teeth with the bore 43. Such bearing support extends around the entire circumference of the radial bore and for the full radial depth thereof except at the bottom where the lowermost teeth project below the wall 24 (Fig. 5) and into the counterbore 23 where they mesh with the teeth 39 on the face gear member 35. The operator, grasping the small fluted knob 51, 53 (Fig. 15) turns the key rapidly in a clockwise direction looking inwardly.

This turns the face gear member 35 in a clockwise direction looking downward. The thrust plug 33, being constrained by the stationary key 45 for axial movement only relative to the body 20, moves downward due to the interengagement of the relatively rotating screw threads 44, 34 provided on the face gear member 35 and thrust plug 33 respectively. As the jaws 29 are pushed downward, their outer edges slide over the conical surface 27 in the nose piece 26 to impart to the jaws, by a camming action, an inward component of motion. Such motion is opposed by the resistance of the rubber body 31 associated with the jaws and forming therewith a collet assembly 30.

As the operator continues to turn the knob 51 on the rotatable key 51, 56, 42, downward movement of thrust plug 33 meets with increased resistance from the rubber body and from the frictional engagement of the jaw edges on the conical recess 27. The resistance to such downward movement increases abruptly as the jaws come into contact with the work piece (not shown). The effect of the resistance is to cause the face gear member 35 to react upward, but such upward thrust is sustained effectively by the bronze washer 36. At the same time, a reactive force is set up in the pinion 42 at the point of engagement of the inter-meshing teeth 42t, 39. Such reactive force, as will be seen from a comparison of Figs. 3 and 5, is in a direction tangent to the pinion and lying in a vertical plane, or more precisely, an infinite series of planes at different distances from the center of the chuck, each of which planes lies at right angles to the axis of the cylindrical bore 43. The entire force of such reaction is transmitted in a torsional direction through the rotatable key 42, 51 or 42, 56 back to the operator, and no component is so directed as to set up a moment of force tending to bend the pinion 42 or to cock it out of alignment with the axis of its bearing surface 43. The operator, upon feeling such increased resistance to rotation, grasps the wire handle between his fingers, thereby gaining greater leverage to tighten the chuck to its final position. When this has been accomplished, as manifested by the tendency of the wire handle 56 to flex, the operator merely removes the rotatable key 42, 51, 56 and the chuck remains securely locked in tightened position by the frictional engagement of the threads 34, 44. He need not manipulate any separate locking device.

When the operator desires to release the work piece from the chuck, he reinserts the key 42 and reverses the direction of rotation thereof, resulting in upward movement of the thrust plug 33 against a very light resistance. During such movement, the bronze washer 36 does not function because the gear member 35 has a tendency to move downward under a small reactive force, which tendency is resisted by the snap ring 37.

From the foregoing description, it will be apparent that the invention has several features or advantages not found in prior devices, or at least not collectively therein, as follows:

(1) Foolproof operation—The chuck must be operated in the correct manner if it is to work at all. In the case of certain prior chucks of the plain bearing key type, the operator, through carelessness or ignorance, may operate the chuck without the use of the key by hand-tightening the chuck sleeve. This allows the chuck jaws to slip, causing premature wear. Similarly, in the case of a prior chuck of the key type, the chuck is frequently operated by the sleeve only, for often the users of these chucks fail to read the operating instructions and do not use the eccentric operating devices.

(2) Economy in manufacturing cost—The illustrative chuck is not expensive to manufacture because most parts can be made on standard machinery; many of them on fully automatic screw machines.

(3) Compact design—The illustrative chuck is small in weight and size thereby effecting a saving in the cost of raw materials. Contributing to the saving is the arrangement of the stationary key 45 or 81 which does not add to the length of the body 20 or of any other parts because it telescopes within a recess in the complementary thrust plug 33 and lies within an area surrounded by the face gear extension 35 and radial bore 43.

(4) Increased gripping power—Due to the high velocity ratio, or mechanical advantage, and the low friction, the present novel gearing arrangement makes it possible to provide a gripping power two or three times greater than those of conventional chucks without any increase in cost, weight or size.

(5) Increased safety—The exterior of the chuck is smooth, and since the operating forces are all applied internally, it is possible to eliminate fluting and gear teeth from exterior diameters where they might otherwise endanger the operator or cause damage to the work.

(6) Greater accuracy—Because the collet centralizing conical recess 27 is fixed in relation to the chuck body 20, the present chuck is more accurate than conventional chucks of the same general type. Also, the present design allows space for full bearing between the conical surface 27 and the edges of jaws 29 (see Fig. 4) even at maximum capacity, thus improving the accuracy of the present chuck in its larger capacity.

(7) Improved gear meshing—With a face gear arrangement having the configuration here shown, no adverse effect results from not inserting the rotatable key 42 as far as it will go. The pinion teeth 42t may be inserted the full depth of the radial bore 43 or to a lesser degree (down to only ⅔ full depth) whereas, in plain bearing type chucks now in use employing conventional bevelled gears, if the key is not fully inserted the gear teeth mesh on their tip ends only resulting in severe distortion and wear of the gear teeth.

(8) Bending stress on key pilots eliminated—As described above, the shape, arrangement and mounting of the pinion 42 and face gear member 35 are such that there are no substantial stresses in operation on the rotatable key assembly 42, 51, 56 except in a torsional direction. In conventional chucks of the type having a bevelled gear operated by a key, there is a bending movement on the pilot portion of the key which is supported in the radial bore of the chuck body.

Figs. 10 and 11 show a modification of the invention which is designed to reduce the axial length of the chuck body without correspondingly reducing the capacity of the chuck, that is, the range of diameters of work pieces. Conversely, the modification may increase the capacity for the same size as compared with the form shown in Fig. 1. In the modification, a face gear member 67 has an upper cylindrical portion 67a and a lower enlarged portion 67b supported for frictional bearing engagement within a bore 68 and counterbore 69 respectively in a body member 71. The construction and arrangement of the face gear member and body are similar to that of Fig. 1 but the upper portion 67a and bore 68 are somewhat shorter in an axial direction than the corresponding elements in the embodiment first described. The lower half of the chuck of Fig. 10 is like that of Fig. 1 and comprises a nose piece 72 cooperating with a collet 73 adapted to be forced downward into clamping position by a thrust plug 74. A salient feature of the modified chuck resides in an intermediate bushing 75 having threads on both outside and inside for engagement with the face gear member 67 and thrust plug 74 respectively. The interior of the bushing 75 has a counterbore 76 lying above the internal threads thereof, said counterbore being adapted to receive a lock ring 77 which is supported in an annular groove near the upper end of the thrust plug 74. Similarly, the face gear member 67 is provided with a counterbore 78 lying above its internal thread, said counterbore being adapted to receive a lock ring 79 which is supported in an annular groove near the upper end of the threaded bushing 75.

In the operation of the modified chuck shown in Figs. 10 and 11, the thrust plug 74 is held against rotation, by means to be described presently, while the face gear member 67 is turned by driving the toothed portion 67t thereof with a rotatable key such as shown in Fig. 15. When the chuck is fully expanded, as in Fig. 10, the thrust plug 74 and intermediate bushing 75 are aligned up at the top with the face gear member 67, and the lock rings 77 and 79 lie adjacent the tops of the counterbores 76 and 78 respectively. Assuming that the threads between the face gear member 67 and intermediate bushing 75 and between the bushing and thrust plug 74 are all left hand, the operator turns the face gear member in a clockwise direction looking inward. This action moves the intermediate bushing 75 downward relative to the face gear member 67 and also moves the thrust plug 74 downward relative to the bushing, such motion being effective to collapse the collet 73 as explained above in connection with the first form of invention. Downward movement of the thrust plug 74 is permitted until the lock rings 77 and 79 reach the lower ends of the respective counterbores 76 and 78 and rest upon the upper ends of the internal threads of the surrounding screw elements.

The introduction of the bushing 75 as an intermediate screw element between the face gear member 67 and thrust plug member 74 provides a telescopic thread which increases the length of travel of the thrust plug 74 and/or permits reduction of the axial length of the face gear member portion 67a and corresponding portion 68 of the body member 71. It also allows engagement of a greater number of threads, thus increasing the strength and accuracy of the threaded connection between the face gear member and thrust plug.

Figs. 10 and 11 show another constructional feature which is modified as compared with Figs. 1 and 2. The modified stationary key 81, which corresponds to the fluted key 45 of Figs. 1 and 2, is made of square bar stock and has a sliding fit at its upper end within a square opening 82 near the upper end of the body member 71. At its lower end the square key has slidable engagement within a square opening 83 in the thrust plug 74. The hole 82 is formed by broaching upwardly, starting at its lower end adjacent bore 68 and continuing toward, but not quite as far as, the upper extremity of body 71, thus leaving an apertured wall 84 which serves as a retainer for the key 81. With this arrangement the key may be disassembled conveniently when desired, but there is no danger that the key will accidentally move upward into the bore of the portable tool spindle and become disengaged from the thrust plug when the parts are near the position shown in Fig. 11. In the broaching operation aforesaid, it is difficult to locate the square hole 82 accurately in line with the axis of the bore 68 and counterbore 69. However, the manufacturing tolerance, incident to the sliding fit between key 81 and the square hole 82, permits the key to adjust itself to a position slightly off center with relation to the hole 82. This feature of adjustment is an advantage over the form of invention shown in Fig. 1 because it is in addition to the adjustment for eccentricity provided by the sliding fit between key 81 and the square hole 83 in the thrust plug. The difference in cross section between the square stock 81 and the square hole 82 need not be great and in operation the key 81 remains substantially stationary in relation to the chuck body 71, to hold the thrust plug 74 against any appreciable turning movement relative to the chuck body.

While the square key 81 is not quite as efficient as the fluted key 45 of Figs. 1, 2 and 7, it has the advantage of reducing the manufacturing cost, especially of the thrust plug. In the first form of invention, the cost of making the thrust plug 33 (Fig. 8) is high due to the fact that there is considerable stock removal in the broaching operation which, in production, would require two or three passes with different size broaches in order to produce the splined hole. In between these passes the chips at the bottom of the hole have to be drilled out in order to obtain the necessary depth of spline. These production difficulties are completely eliminated by the use of the square key 81 (Fig. 11) and the correspondingly square hole 83 (Fig. 11) broached in the thrust plug 74 in one pass of the broaching tool, for the amount of stock removal is slight.

Fig. 12 shows a further modification comprising a body member 85, nose piece 86, face gear member 87, intermediate bushing 88 and thrust plug 89. The thrust plug is driven by a telescopic screw having substantially the same construction and mode of operation as in Figs. 10 and 11. The further modification differs from Fig. 10 in the arrangement for attaching the chuck to the portable tool spindle. In Fig. 12, the tool spindle 91 is provided with an externally threaded extension 92 received within a threaded bore 93 in the chuck body 85. The thrust plug 89 is not bored or internally recessed but is provided with an integral extension 94 which has a sliding fit within a hole 95 in the extension of spindle 91. The thrust plug extension 94 may be provided with any suitable non-circular cross-section to prevent turning, which may be the same as the stationary keys in the preceding embodiments described, or may be as hexagonal as shown in Fig. 12.

Figs. 13 and 14 show a still further modification comprising a body member 96, nose piece 97, collet 98, face gear member 99 and thrust plug 100. The face gear member has a threaded connection with the thrust plug whereby rotation of the former by the key 42 actuates the thrust plug as previously described to collapse the collet from the position shown on the left side of Fig. 13 to the position shown on the right side. Unlike the thrust plug in the embodiment of Fig. 1, or of Fig. 10, thrust plug 100 is not internally recessed to receive a stationary key but instead it is provided with a pair of tongues or splines 101 (Figs. 13 and 14) extending outward and slidably mounted within grooves 102 on the inside wall of the chuck body 96. The arrangement of the external tongues 101 on the thrust plug 100 in Figs. 13 and 14 has an advantage over the internal recess provided in the thrust plugs of the first two embodiments of this invention, because it provides a reactive force resisting rotation of the thrust plug at a point which is much further away from the center of rotation. Increasing the moment arm of the reactive force causes a corresponding reduction in the pressure of the tongue against the groove, assuming that the amount of torque reaction necessary to be overcome is the same. Reducing the pressure at the point of contact along the splines 101 reduces the friction, and hence enables the chuck to be operated with less effort without rendering it any the less self-locking. However, the modification of Fig. 13 has a disadvantage over that of Fig. 1 because the chuck body 96 has to be increased in size by an amount corresponding approximately to the length of the longitudinal grooves 102.

Fig. 13 shows another feature of modification. The bronze washer 36 which sustains the upward thrust of the face gear member 99, is replaced by an anti-friction thrust bearing comprising a set of balls 103 rolling in raceways provided on the top of the face gear member 99 and on the adjacent wall of the body member 96.

Referring now to Fig. 19, a modified chuck body 105 has an upward extension 106 threaded for attachment to a machine tool or drill (not shown). The extension 106 is similar to the corresponding element in the embodiment of Fig. 10 but the central opening 107 therein is generally in the shape of a cylindrical bore interrupted by longitudinal recesses 108. The recesses may be formed by broaching, and, as seen in Fig. 20, they provide a means for receiving, with a non-rotating fit, the corners of a square key (not shown) similar to key 81 of Fig. 10.

Body member 105 has a central bore 109, a counterbore 111, and a horizontal wall or shoulder 112 therebetween. The bore and counterbore are similar in dimensions to the bore 22 and counterbore 23 respectively of Fig. 1 and provide means for rotatably supporting the face gear member 35 of Figs. 1 and 9 with the horizontal wall 112 in close, uniformly spaced relation to the crests 39C (Fig. 9) of the face gear teeth 39. Body member 105 also has one or more radial bores 113 (three being shown), each similar to bore 43 (Fig. 2) and cutting through the horizontal wall or shoulder 112. Each radial bore has a cylindrical surface providing a bearing for rotatably supporting a pinion 114 (Fig. 21). Near the periphery of the chuck body 105, the bearing surface of radial bore 113 extends for 360 degrees or completely around the adjacent portion of the pinion. However, the inner portion of the bore 113 extends about two-thirds the distance around the pinion 114 and the cylindrical bearing surface of the bore joins the plane horizontal surface of shoulder 112 at an acute angle, defining therebetween a sharp edge 115T or 115L, one on either side of the radial bore. The edges 115T and 115L of each bore 113 are horizontal and parallel with each other with the result that the pinion has as much bearing support at its free end where it lies adjacent the central bore 109 as it does at a region spaced from the free end and lying adjacent the counterbore 111.

The pinion 114 (Fig. 21) has teeth provided with cylindrical crests 118 comparable with the crests 42C on pinion 42 (Fig. 5). As long as the crests of the teeth fit closely within the radial bores 113 the pinion 114 will be maintained in proper coaxial relation with the bore with its axis indicated by the broken line 119 in Fig. 19. If the pinion has a loose fit in the bore, however, either because of manufacturing tolerances or as a result of wear, and if the operator pulls upward on the handle portion (51 or 56, Fig. 13) of the key, the axis of the pinion may be misalined as indicated by the broken line 121 in Fig. 19. With the key and pinion thus misalined and the key turned in a direction to tighten the chuck, the teeth 117 may clash with the edge 115T. Conversely, with the key thus misalined but turned in a loosening direction, the teeth may clash with the edge 115L.

Figs. 22, 23 and 24 show a modified chuck body designed to prevent such clashing of teeth. The modified body 122 has a central bore 123, a counterbore 124, and a set of radial bores 125, each bore having the same diameter and relative position as in the case of the corresponding bore of Figs. 19, 20 and 21. The chuck body 122, however, is provided with a chamfered shoulder or conical wall 126 in place of the horizontal wall 112. The lower end of the conical wall 126 may be separated from the counterbore 124 by a short annular recess 127. The upper end of the conical wall or shoulder intersects the central bore 123 and, due to its taper, shortens the length of the bore 123 as compared with the bore 109 above the horizontal shoulder 112 in Fig. 19. The conical shape of shoulder 126 also reduces part of the bearing area of the radial bore 125. The surface of the latter intersects with the conical shoulder 126 at a right angle or obtuse angle, forming therebetween an edge 128T or 128L, one on either side of the radial bore. The edges 128T and 128L correspond in some respects with the edges 115T and 115L respectively of Figs. 19, 20 and 21 but are not parallel or straight. As seen best in Fig. 23, the edges 128T and 128L are of curved or parabolic shape and diverge from the outer part of the radial bore 125 toward the inner end thereof.

With this arrangement (Fig. 24) the pinion 114 is supported around its entire circumference at the extreme outer end of the radial bore 125; and is supported for two-thirds its circumference near the outer end; as in the case of Fig. 21. The arc of bearing support diminishes gradually toward the inner end of the radial bore where the bore 125 embraces only half of the circumference of the pinion. It is at this inner end where the pinion is subject to the greatest displacement when the axis is misalined as indicated by the broken line 121 (Fig. 19). The result of this arrangement is that the misalined pinion may approach the edge 128T or 128L when it is turned for tightening or loosening respectively, but does not actually come into contact with the edge. Thus the modification of Figs. 22–24 provides bearing support for the pinion where needed but eliminates just enough of the bearing surface to obviate the danger of clashing teeth as above described.

Because the edges 128L and 128T are curved (Fig. 23) and inclined with respect to the longitudinally extending teeth 117, they engage and disengage the teeth gradually or progressively in response to rotation of the pinion 114 through an angle of considerable magnitude. Referring to Fig. 24, the tooth in the 6:00 o'clock position, at the bottom of the pinion, is out of contact with the radial bore 125 except where the outer end of the pinion has continuous bearing engagement with the periphery of the chuck body 122. If the pinion is rotated clockwise, for loosening the chuck jaws, the tooth aforesaid will start to make contact wtih the inner portion of the radial bore 125 when the tooth reaches approximately the 8:00 o'clock position. The point of initial contact between tooth crest 118 and curved edge 128L is at the bottom of the curved edge and near the outer end of the tooth. Such initial contact is not accompanied by clashing (as in the case of Figs. 19–21) because the outer region of the tooth and pinion is not displaced as much as the inner or free end of the pinion (see broken line 121, Fig. 19). As the tooth continues to move clockwise, the point of bearing contact shifts upwardly along the curved edge 128L and at the same time the area of contact expands inwardly along the crest 118 of the pinion. When the tooth reaches approximately the 9:00 o'clock position, it is supported substantially throughout the length of tooth crest 118. The result is a smooth operation of the gear teeth adjacent the conical wall 126 of Figs. 22, 23, 24 as compared with the abrupt engagement of the teeth along the flat wall or shoulder 112 in the device of Figs. 19, 20 and 21. In the device last mentioned, the edges 115L and 115T extend parallel to the teeth 117 and are suddenly engaged with the inner end of the teeth without any previous engagement spreading gradually from the outer end.

It is obvious that features of construction shown in one form of invention may be combined with those shown in other forms, as no attempt has been made to illustrate all permutations or combinations. For example, a chuck of the general arrangement shown in Fig. 1 may be modified by adopting the square stationary key of Fig. 10 and/or the ball thrust bearing of Fig. 13.

The terms "upper," "lower," "horizontal" and the like, appearing in the specification and claims are used only for convenience in describing the location of one part relative to another, and have no geographical significance as the operation of the chuck is not affected by gravity.

What is claimed is:

1. A chuck comprising a housing having a conical recess therein, a jaw assembly supported in said housing and recess for relative movement with axial and radial components, a thrust plug separate from the jaw assembly and abutting against the larger end of the jaw assembly and adapted upon axial movement toward the jaw assembly and conical recess to collapse the jaws, a ring gear supported in the housing co-axially with respect to the recess, manipulative means for rotating the ring gear, and a power transmitting device for converting rotary movement of the ring gear into axial movement of the thrust plug, said power transmitting device comprising a screw threaded connection between the ring gear and thrust plug and also comprising means for preventing the thrust plug from rotating relative to the housing, said last named means being interposed between the thrust plug and housing independently of the jaw assembly and providing a positive lock against rotation in different axial positions of the thrust plug with respect to the housing.

2. A chuck according to claim 1, in which the means for preventing the thrust plug from rotating comprises a sliding connection between the thrust plug and housing said connection including a non-circular key slidably received within a cooperating recess located at the center of the housing.

3. A chuck according to claim 2, in which the key is stationary with respect to the housing and in which the cooperating recess is formed in the thrust plug.

4. A chuck according to claim 2, in which the key is affixed to the thrust plug and in which the recess is stationary with respect to the housing.

5. A chuck according to claim 3, in which the stationary key has a cylindrical surface interrupted by longitudinal flutes, and the thrust plug recess has a complementary shape with longitudinal splines extending into the flutes.

6. A chuck according to claim 5, in which the splines fit the side walls of the flutes to prevent relative rotation between the key and thrust plug but are of less radial depth than the flutes to permit adjustment for any eccentricity of the thrust plug and the part of the housing on which the stationary key is supported.

7. A chuck according to claim 3, in which the area over which the stationary key and thrust plug have sliding engagement is surrounded by the area over which the ring gear and thrust plug have threaded engagement, whereby the location of the stationary key conserves space and provides a compact assembly.

8. An internally geared chuck comprising a body having a cylindrical bore, a cylindrical counter-bore lying co-axially below the bore and separated therefrom by a shoulder in said body, a nose piece attached to the body co-axially thereof and lying below the counterbore, said nose piece having a downwardly tapering recess therein, a set of jaws supported in the recess portion of the nose piece, a thrust plug engaging the upper end of the jaws, a gear member having a lower enlarged portion supported for rotation in the counterbore and having a reduced extension supported for rotation in the bore, thrust supporting means at the upper and lower ends of the gear member to resist axial movement thereof relative to the body, the gear member having an annular row of teeth atop its enlarged portion lying below the shoulder and spaced therefrom, bearing means in said body extending radially outward from said reduced extension, a driving pinion removably supported in said bearing means in meshing relation to the annular row of teeth, the inner end of the pinion being adapted to abut the reduced extension on the gear member, and power transmitting means for converting rotary movement of the gear member relative to the body into axial movement of the thrust plate relative to the body to collapse the jaws.

9. An internally geared chuck according to claim 8, in which the annular row of teeth forms a face gear, the teeth being of uniform altitude and having crests which lie in a horizontal plane just below the shoulder in the body, the teeth on the pinion also being of uniform altitude.

10. An internally geared chuck according to claim 8, in which the thrust supporting means at the lower end of the gear member comprises a snap ring supported in an annular groove in the body located adjacent to the counterbore.

11. An internally geared chuck according to claim 8, in which the shoulder in the body which connects the bore to the counterbore is of conical shape.

12. An internally geared chuck comprising a body having a central bore, a counterbore and a conical shoulder connecting the bore to the counterbore, a gear member having an enlarged portion supported for rotation in the counterbore and having a reduced extension supported for rotation in the bore, the gear member having an annular row of teeth facing the conical shoulder, the body having a radial bore substantially tangent to the plane of the row of teeth and adapted to provide a bearing support for a driving pinion, the radial bore intersecting the conical shoulder to form a pair of curved edges diverging toward the inner end of the radial bore, the circumference of the radial bore diminishing gradually toward the inner end to prevent clashing of the pinion against the curved edges, jaws supported in the body, and power transmitting means responsive to the rotation of the gear member in one direction for moving the jaws in the closing direction.

13. A chuck comprising a housing having a conical recess therein, a jaw assembly supported in said housing and recess for relative axial movement with a component of motion in an inward or outward direction, a gear member mounted in the housing for rotation co-axially of the recess but held against axial movement in the housing, and power transmitting means for converting rotary motion of the gear member into axial movement of the jaw assembly, said power transmitting means comprising a jaw engaging member, an intermediate member connected to both the gear member and the jaw engaging member and means for preventing the jaw engaging member from turning, the intermediate member being adapted to rotate and move axially as it is driven by the gear member.

14. A chuck according to claim 13, in which the intermediate member has threaded engagement with both the face gear member and the jaw engaging member.

15. A chuck according to claim 14, in which the intermediate member consists of a bushing having threaded engagement on its outside with the gear member and having threaded engagement on its inside with the jaw engaging member.

16. A chuck according to claim 15, in which the means for preventing the jaw engaging member from turning comprises a key of non-circular cross-section, said key cooperating with a recess to form a sliding connection between the jaw engaging member and housing, the key and recess being arranged co-axially of the housing.

17. A chuck comprising a housing, a face gear member rotatably supported therein, said housing having a radial bore extending transverse to the axis of rotation of the face gear member, a pinion insertable into the radial bore and supported for rotation therein, said pinion and face gear having meshing teeth each of which is of uniform altitude from its inner end to its outer end, the peripheral edges of the pinion teeth having bearing engagement with the radial bore to prevent displacement of the pinion radially thereof, said pinion being displaceable axially without disturbing the conjugal relation between the teeth, jaws supported in the housing, and power transmitting means responsive to the rotation of the face gear member in one direction for moving the jaws in the closing direction.

18. A chuck according to claim 17, in which the crests of the teeth on the pinion have a substantial area and combine to form an interrupted cylindrical surface engaged within the radial bore.

19. A chuck according to claim 17, in which the face gear member has an enlarged portion upon which the face gear teeth are formed and has a reduced extension which closes the inner end of the radial bore, said enlarged portion and reduced extension fitting a counterbore and bore respectively in the housing.

20. A chuck according to claim 19, in which the reduced extension on the face gear member provides an abutment for the inner end of the pinion and thereby limits movement of the pinion inwardly of the radial bore.

21. A chuck according to claim 20, in which the face gear member is internally threaded to receive a complementary threaded driven element and which includes means for resisting axial movement of the face gear member and rotary movement of the driven element, whereby rotation of the face gear member by the pinion imparts axial movement to the driven element.

22. A chuck according to claim 21, in which the driven element has a slidable but non-rotatable connection with the housing.

23. A chuck according to claim 22, in which the driven element has a threaded connection with a thrust plug, the driven element being externally threaded for engagement with the face gear member and internally threaded for engagement with the thrust plug thereby forming a telescopic screw device.

24. A chuck comprising a body, said body having an axial bore and a counterbore below the bore, a nose piece detachably connected to the body below the counterbore and cooperating with the body to form a housing, the inner surface of the nose piece tapering downwardly, a face gear member rotatably supported in the housing and having an enlarged portion in the counterbore and a reduced upward extension in the bore, the gear member having an annular row of teeth atop its enlarged portion near the upper end of the counterbore, the axial bore having one or more radial bores, the upper portion of each radial bore extending outwardly from the axial bore and the lower portion of each radial bore extending outwardly from the counterbore, said radial bore being adapted for the reception of a pinion movable into and out of mesh with the teeth on the face gear member, an assembly of jaws mounted in the nose piece and having inclined edges engaging the tapered surface, a thrust plug having a disc portion seated on top of the jaw assembly and arranged to force the jaws down into camming engagement with the tapered surface, the thrust plug having an upward extension received within the face gear member, the outer surface of the thrust plug extension and the inner surface of the face gear member having interengaging screw threads arranged to raise and lower the thrust plug relative to the face member upon relative rotary movement therebetween, means interposed between the face gear member and the body for preventing the face gear member from moving axially relative to the body, and means interposed between the thrust plug and body for preventing the thrust plug from rotating relative to the body while permitting relative axial movement, said last mentioned means comprising a key of non-circular cross section disposed in line with the axis of rotation of the face gear member, the upper portion of the key being supported on the body and the lower portion of the key having a sliding connection within a non-circular recess formed in the upper extension of the thrust plug.

25. A chuck according to claim 24, in which the key has a fit within a recess provided in an end wall which closes the axial bore at the upper end of the body.

26. A chuck according to claim 24, in which the screw threads in the face gear member extend for a substantial distance below the lower extremity of the key, thereby permitting the thrust plug to be rotated relative to the body during initial assembly or final disassembly with relation to the face gear member.

References Cited in the file of this patent

UNITED STATES PATENTS

| | | |
|---|---|---|
| 896,663 | Rahm | Aug. 18, 1908 |
| 1,370,598 | Lapointe | Mar. 8, 1921 |
| 1,620,440 | Cary | Mar. 8, 1927 |
| 2,683,041 | Haviland | July 6, 1954 |